Figure 1:
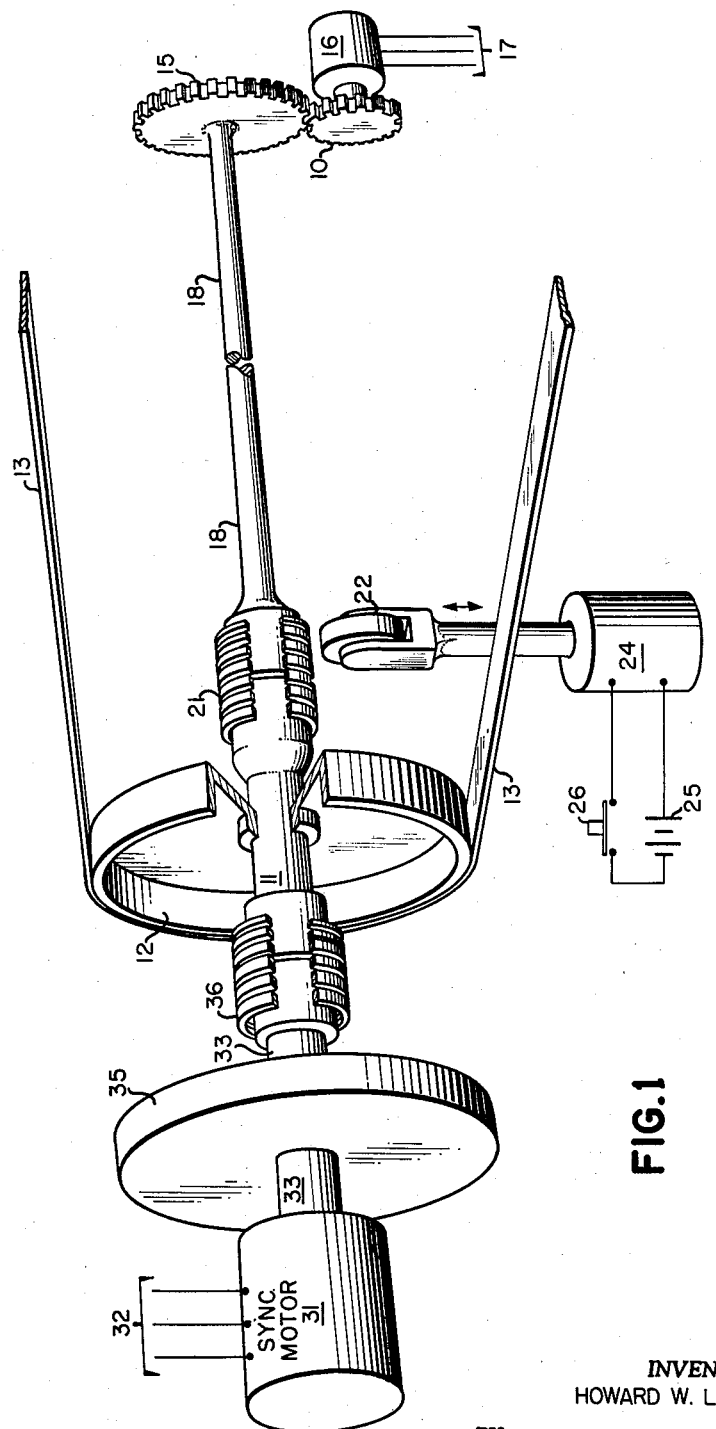

United States Patent Office 2,923,172
Patented Feb. 2, 1960

2,923,172

HIGH-SPEED CLUTCHED DRIVE SYSTEM WITH SPEED REGULATION

Howard W. Lewis, San Jose, Calif., assignor to International Business Machines Corporation, New York, N.Y., a corporation of New York Application February 6, 1959, Serial No. 791,643

6 Claims. (Cl. 74—665)

This invention relates in general to drive systems and relates more particularly to drive systems for quickly accelerating a load to a given speed and then maintaining the load at this given speed.

In driving many types of loads it is desirable that the load be brought up to speed rapidly with a minimum of shock to the system and that the desired speed be maintained with a minimum of hunting or oscillation in the speed regulating system. To accomplish both of these ends, I have provided a novel driving and speed regulation system which permits a load to be accelerated to the desired speed in a minimum amount of time and with a minimum of mechanical shock to the system, and once the load has attained the desired speed, the speed may be maintained with a minimum of hunting. In accordance with the present invention there is provided a variable-speed, nonsynchronous driving motor which tends to run at a speed greater than the desired speed of the load. This motor is connected to the load to be driven through a flexible output bar or shaft which is selectively clutchable to the load. The clutch mechanism is a high-speed device which, upon energization, rapidly connects the resilient, rotating driving shaft to the load shaft. The shock of connecting the driving shaft to the driven shaft is absorbed in the torsion or flexing of the resilient driving shaft, thus reducing the mechanical shock to the system. The load is thus quickly accelerated to the desired speed.

To maintain the speed of the driven member at the desired speed there is provided a synchronous motor which is connected to the output shaft through a second clutch member which is operative to connect the synchronous motor to the output shaft when the speed of the output shaft equals or tends to exceed the speed of the synchronous motor. When the nonsynchronous motor tends to drive the load at a speed above the speed of the synchronous motor, the second clutch member connects the synchronous motor to the load to tend to maintain the load speed at the speed of the synchronous motor. The system is so designed that the torque generated by the nonsynchronous motor at the speed of the synchronous motor is sufficient to keep the second clutch member engaged, but it is not sufficient to drive the synchronous motor out of synchronism. Thus, the portion of the torque generated by the nonsynchronous motor which is in excess of the torque required to maintain the load at synchronous speed causes an increase in the torsion of the resilient bar connecting the nonsynchronous motor to the load and also produces a slight increase in the slip angle of the synchronous motor. When synchronous speed is reached and the second clutch member engages, as described above, any transient oscillations in the system appear either as oscillations in the amount of torsion in the resilient output bar of the nonsynchronous motor or as oscillations in the slip angle of the synchronous motor, and since both extremes of these oscillations are greater than the oscillation magnitude which is required to keep the second clutch member engaged, no variation in speed is present at the output shaft. Thus, in the system of the present invention the output shaft approaches synchronous speed rapidly with a minimum of mechanical shock to the system and maintains this synchronous speed without transient variations or hunting.

The present invention may also be utilized in connection with a two-way drive system in which an output shaft is to be driven in either of two directions. In this application the nonsynchronous motor, in addition to driving the resilient output bar corresponding to the forward direction of the output shaft, also drives a second resilient output bar corresponding to the reverse direction of rotation for the output shaft. The forward and reverse resilient output bars are selectively clutchable to the output shaft by respective clutching mechanisms which provide for high-speed coupling of the selected driving shaft to the output shaft. The forward and reverse direction clutching members are preferably interlocked so that only one of them may be engaged at a given time. Thus, to change from one direction of rotation to the other, one of the clutches is disengaged and the other clutch is engaged. The resilient output bar connecting the nonsynchronous driver motor to the load absorbs energy to aid in rapid deceleration of the load.

It is therefore an object of the present invention to provide improved apparatus for rapidly accelerating a driven load to a given speed and for maintaining the load at that speed.

It is a further object of the present invention to provide apparatus for accelerating a load to a given speed in which the load is connected to a nonsynchronous motor through a resilient torsion bar which is selectively clutchable to the driven member to provide rapid, shock-free acceleration of the load to the desired speed, and in which a synchronous motor is connectable to the driven load when the speed of the load exceeds the speed of the synchronous motor, so that the synchronous motor absorbs energy at load speeds above the synchronous speed to maintain the load speed substantially constant at the speed of the synchronous motor.

It is an additional object of this invention to provide apparatus for rapidly accelerating a load to a given speed by clutching the load to a nonsynchronous motor through a resilient torsion bar which absorbs the shock of the clutching operation, and by clutching a synchronous motor to the load when the load speed tends to exceed the speed of the synchronous motor, so that the synchronous motor absorbs energy to maintain the load speed at the speed of the synchronous motor.

It is a further object of the present invention to provide apparatus for driving a load in either forward or reverse direction in which a nonsynchronous motor has a pair of resilient torsion output shafts which are selectively connectable to the load to drive the load in either forward or reverse direction and in which the resilient torsion shafts absorb the shock of accelerating and decelerating the load, and a synchronous motor is connectable to the load when the speed of the load exceeds the speed of the synchronous motor so that the synchronous motor tends to maintain the speed of the load at the speed of the synchronous motor.

Other objects of the invention will be pointed out in the following description and claims and illustrated in the accompanying drawings which disclose, by way of example, the principle of the invention and the best mode which has been contemplated of applying that principle.

Figure 2:
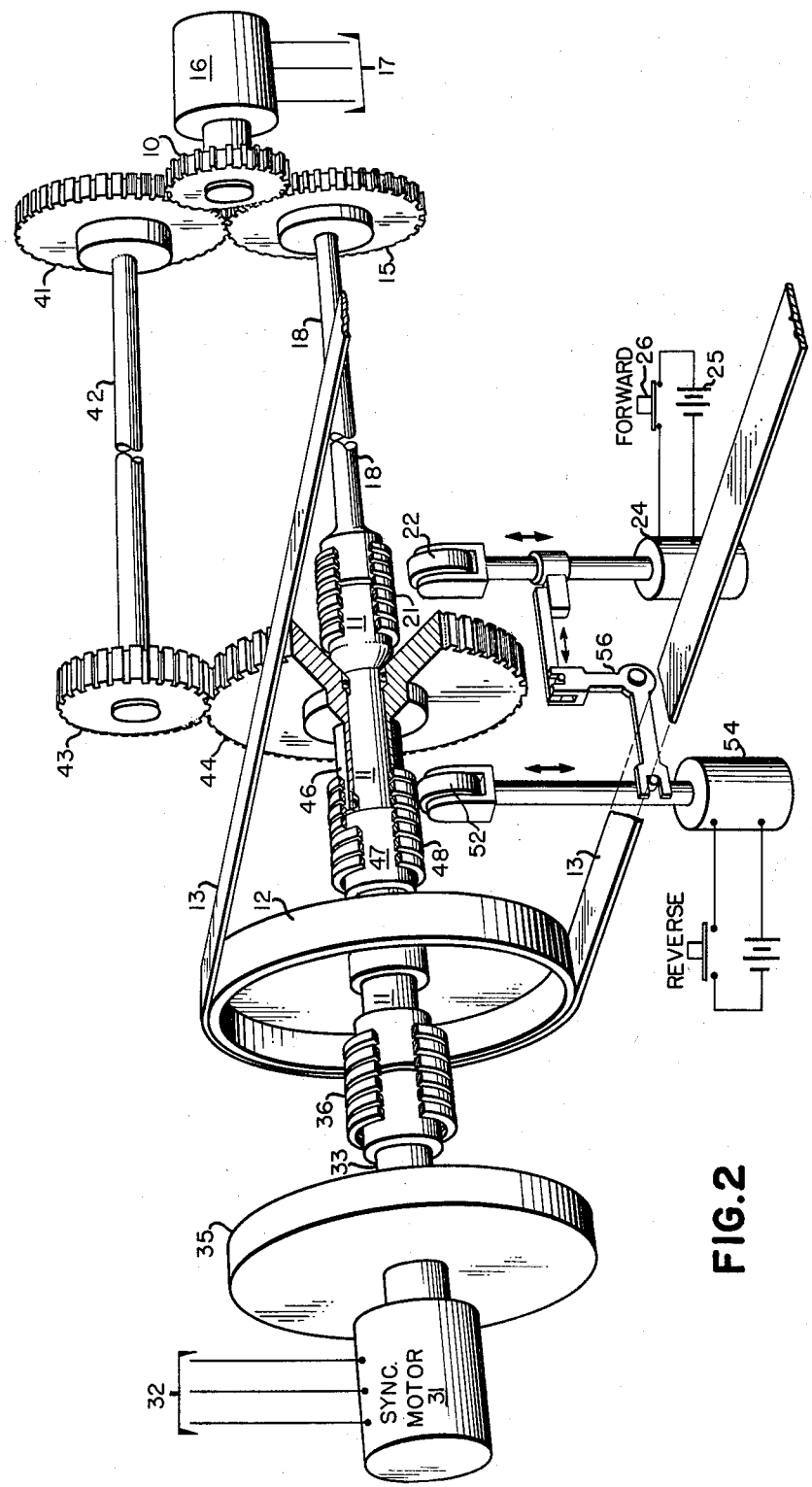

In the drawings:

Fig. 1 is a perspective view, partly in section, illustrating the application of the present invention to a drive system for rapidly accelerating a load to a given speed and for maintaining the speed of the load substantially constant at the given value; and Fig. 2 is a perspective view, partly in section, illustrating a system which provides both forward and reverse rotations of an output shaft in accordance with the present invention.

Referring to Fig. 1 by character of reference, numeral 11 designates an output shaft which is to be driven in accordance with the present invention. Output shaft 11 is connected to the load to be driven in any suitable manner; in the illustrated embodiment there is included a driver wheel 12 which is keyed to shaft 11 and which in turn drives a belt member 13 which is connected to the load (not shown). It is assumed that the load is of a type which is to be rapidly accelerated to a given speed and then maintained at that speed within very close limits. The primary power for driving shaft 11 and the load is supplied from a nonsynchronous motor, such as an induction motor 16, which is connected to a suitable source of electrical current represented by conductors 17. Motor 16 is provided with a gear 10 which meshes with a gear 15 to drive a resilient output shaft which may be in the form of a torsion bar 18. As indicated by its name, torsion bar 18 is capable of flexing to absorb shock and oscillation appearing in the system. Torsion bar 18 is connected to the load output shaft 11 through suitable high-speed clutching means.

Such clutching means may be of any suitable type, but preferably they are the coil spring type 21 having a plurality of closely spaced turns of rectangular cross section. Spring 21 is coaxially disposed on shafts 11 and 18, and sufficient clearance is provided between the inner coil faces of spring 21 and the outer diameters of shafts 11 and 18 to allow slippage of shafts 11 and 18 within the coil spring in either direction. This corresponds to the disengaged or deenergized condition of the clutch. Engagement of the clutch is controlled by a roller member 22 which is selectively movable into position against spring 21 to press the end of spring 21 against shaft 18. This pressing of the end of spring 21 against shaft 18 will cause the end of shaft 18 to grab the end of spring 21 and twist it, thus causing spring 21 to tighten up rapidly on both shaft 18 and shaft 11. Thus, spring 21 effectively couples shaft 18 to shaft 11 to cause the driven shaft 11 to follow the driving shaft 18. The positioning of roller 22 may be controlled by any suitable means, such as a solenoid 24 which is selectively energizable from a battery 25 through a switch 26 to position roller 22 against the end of spring 21 to thus produce the above described controllable clutching action.

Output shaft 11 also has selectively connectable thereto a synchronous motor 31 which is energized from a suitable source of alternating current represented by conductors 32. Synchronous motor 31 is provided with an output shaft 33, and may also be provided with a flywheel 35 to aid in absorbing energy fluctuations. The output shaft 33 of synchronous motor 31 abuts the end of the output shaft 11 and these abutting ends are provided with a second clutching mechanism in the form of a spring member 36 which extends coaxially of the ends of shafts 11 and 33. Spring 36 is disposed over the ends of shafts 11 and 33 so that very little clearance is allowed between the inner face of the coils of spring 36 and the outer diameters of shafts 11 and 33. Thus, shaft 11, in turning in one direction, will grab the end of spring 36 and twist it, thus causing the spring to tighten up rapidly on both shafts 11 and 33 to cause the driven shaft to follow the driving shaft. However, when shaft 11 turns in the opposite direction, the frictional forces present tend to unwind spring 36 and thus slippage occurs between spring 36 and shafts 11 and 33. Thus, when the speed of synchronous motor 31 and output shaft 33 is greater than the speed of output shaft 11, spring 36 is carried by shaft 33 and does not engage shaft 11 so that no clutching action is present. However, if the speed of output shaft 11 increases above the speed of shaft 33 and motor 31, the end of spring 36 is grabbed by shaft 11 and twisted in the manner described above to effectively connect motor 31 to shaft 11.

Assuming that motors 16 and 31 are operating and driving their associated shafts 18 and 33 and assuming that the rest of the elements are at rest, the operation of the present invention to accelerate the load to the desired speed and maintain the load at this speed is as follows. Nonsynchronous motor 16, when not clutched to the load shaft 11, runs at a speed greater than the speed of synchronous motor 31 and the desired speed of the load. Switch 26 may be closed to energize solenoid 24 to force roller 22 against the end of spring 21 which surrounds shaft 18. As described above, this pressing of roller 22 against spring 21 causes the spring to tighten rapidly on shafts 11 and 18 to effectively clutch these shafts together. Shaft 11, wheel 12, belt 13, and the driven load are thus accelerated quickly, with the mechanical shock of this acceleration being cushioned or absorbed to a large extent by the resilient torsion bar 18, thus reducing the mechanical shock to the system of the clutching operation and the rapid acceleration of the load.

Motor 16 tends to drive the load at a speed greater than the speed of synchronous motor 31. However, when the speed of the output shaft 11 reaches the speed of the synchronous motor 31, the overriding clutch spring 36 engages, thus connecting shaft 11 to motor 31 and shaft 33. With motor 31 connected to shaft 11, any tendency of motor 16 to exceed the speed of synchronous motor 31 is damped out by motor 31, thus producing substantially constant speed of motor 16 and shaft 11. The system is so designed that the torque generated by motor 16 at the speed of synchronous motor 31 is sufficient to keep overriding clutch spring 36 engaged but it is not sufficient to drive synchronous motor 31 out of synchronism. Thus, the portion of the torque generated by motor 16 which is in excess of the torque required to maintain output shaft 11 at the speed of synchronous motor 31 produces an increase in the torsion in torsion bar 18 and also produces a slight increase in the slip angle of synchronous motor 31.

Additionally, when synchronous speed is reached and the overriding clutch spring 36 engages, any transient oscillations in the system appear as oscillations in the amount of torsion in torsion bar 18 or as oscillations in the slip angle of synchronous motor 31, but since both extremes of these oscillations are greater than the magnitudes required to keep the overriding clutch 36 engaged, no variation in speed occurs in the output shaft 11. Thus, the output shaft 11 approaches synchronous speed rapidly, with the mechanical shock of the clutching and acceleration being absorbed to a large extent by torsion bar 18, and the system maintains synchronous speed thereafter without transient variations, owing to the absorption of the energy of these transient variations in the torsion of torsion bar 18 or in the slip angle of synchronous motor 31.

Fig. 2 illustrates an alternative embodiment of the present invention which provides for both forward and reverse rotation of output shaft 11. As shown in Fig. 2, the apparatus again includes the nonsynchronous motor 16 having a driving gear 10 which drives the forward drive gear 15 and the forward resilient torsion bar 18. Gear 10 also drives a reverse gear 41 which is connected to a reverse torsion bar 42. In Fig. 2 reverse drive gear 41 is shown as a larger gear than forward drive gear 15, indicating that the reverse speed is less than the forward speed, although it will be apparent that this relationship is not necessary to the operation of the present invention. As in the embodiment of Fig. 1, the forward torsion bar 18 is selectively clutchable to the driven shaft 11 by means of spring 21 which is forced against the ends of shafts 11 and 18 by roller 22 to effectively clutch shafts 11 and 18 together.

To provide for reverse rotation of shaft 11 and the driven load, reverse torsion bar 42 is connected to a gear 43 which in turn meshes with a gear 44. Gear 44 has a hub 46 which is integral with gear 44 and rotates therewith. Hub 46 extends around shaft 11 but is rotatable separately therefrom. The end of hub 46 abuts against a hub member 47 which is fixed to the output driver wheel 12. A reversing clutch spring 48 extends coaxially of the abutting ends of hubs 46 and 47 to provide selective clutching of hub 46 to hub 47. This clutching is under the control of a roller member 52 which is actuated by a solenoid 54 to cause roller 52 to press against the end of spring 48. This causes spring 48 to tighten on hub 46 to thus clutch member 46 to member 47. As shown in Fig. 2, rollers 22 and 52 are preferably provided with an interlocking lever 56 which prevents simultaneous operation of the forward and reverse direction clutches. Output shaft 11 is also connected to synchronous motor 31 through the overriding clutch spring 36 in a manner similar to that described above in connection with the embodiment of Fig. 1.

Assuming that motors 16 and 31 are operating and that it is desired to drive output driver wheel 12 in the forward direction, the operation of the invention is as follows. Switch 26 is closed to energize solenoid 24 from battery 25 to force roller 22 against the end of spring 21. This causes spring 21 to tighten on the end of shaft 18 and thus effectively clutch shaft 18 to shaft 11. It will be noted that interlock lever 56 prevents operation of reverse clutch actuating roller 52 while the forward clutch actuating roller 22 is engaged. The shock of the clutching operation is absorbed or cushioned to a large extent in flexible torsion bar 18 so that there is a minimum of mechanical shock to the system as shaft 11 and output driver wheel 12 rapidly approach synchronous speed. At this time gear 10 on the nonsynchronous motor 16 is also driving the reverse drive gear 41, shaft 42, gears 43 and 44, and hub 46, but since the reverse clutch spring 48 is not engaged, there is no clutching of member 46 to member 47.

When the velocity of the output driver wheel 12 reaches the speed of the synchronous motor 31, the overriding clutch spring 36 engages to maintain the speed of output driver wheel 12 at the speed of synchronous motor 31 in a manner similar to that described above in connection with the embodiment of Fig. 1. Again, variations or oscillations appearing in the system are absorbed either by variations in the torsion of torsion bar 18 or by variations in the slip angle of synchronous motor 31 to provide a stable, constant speed drive for the load.

To reverse the direction of rotation solenoid 24 is de-energized to disengage roller 22 from the end of spring 21, thus declutching shaft 18 from shaft 11. At the same time solenoid 54 is energized to drive roller 52 against the reverse clutch spring 48, thus causing this spring to tighten down on hub 46 and produce a twisting of sphing 48 on hubs 46 and 47. Hub 47 and output driver wheel 12 are thus effectively clutched to hub 46 in the reverse drive gear train and the deceleration of output driver wheel 12 from its forward speed is cushioned by the reverse torsion bar 42 to quickly bring the load and output driver wheel 12 to zero velocity and then rapidly accelerate them in the reverse direction of rotation. If desired, an electrical brake or other device may be utilized to aid in producing the desired deceleration of the output driver wheel 12.

Thus, output driver wheel 12 is rapidly accelerated toward the desired speed in the reverse direction with the flexible torsion bar 42 absorbing to a large extent the energy resulting from the rapid deceleration from forward rotation and acceleration in the reverse direction.

If desired, regulation of the speed of output driver wheel 12 in the reverse direction may be provided by gearing synchronous motor 31 to the reverse drive system through a second overriding clutch similar to clutch spring 36. It will be understood that this reverse overriding clutch would be similar to clutch spring 36 and would be disposed so as to connect the output shaft of synchronous motor 31 to the output driver wheel 12 only when the speed of output driver wheel 12 in the reverse direction tended to exceed the speed of synchronous motor 31. Thus, the speed of the output driver wheel 12 and its associated load can be maintained constant in the reverse direction at the speed of synchronous motor 31, with any oscillations in the system being absorbed either in variations in the torsion of reverse torsion bar 42 or in variations in the slip angle of synchronous motor 31 to provide a substantially constant speed drive system in either the forward or reverse direction.

On the basis of the above description it will be seen that I have provided a novel drive system which permits the rapid, shock-free acceleration of a load from rest to a desired speed and the maintenance of the load at this speed within very close limits through the joint use of flexible torsion members and a synchronous motor. The torsion members cushion the shock of accelerating and decelerating the load member and also absorb transient oscillations appearing in the system which would otherwise tend to vary the speed of the driven load, and the synchronous motor, through the use of the overriding clutch mechanism, provides damping to maintain the speed of the driven load at the speed of the synchronous motor. Thus, the system of the present invention provides a stability which is considerably in excess of that which could be obtained by the simple use of torsion bars for shock relief. In the present system, the acceleration of the load is under the control of the nonsynchronous motor and torsion drive shaft or shafts. However, at the instant the load speed reaches the desired speed, i.e., the speed of the synchronous motor, the speed control is effectively transferred to the synchronous motor so that any speed oscillations or variations which appear in the nonsynchronous motor and/or the flexible torsion shafts have no effect on the speed of the load.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for driving a load at a substantially constant speed comprising a nonsynchronous motor, a flexible shaft driven by said nonsynchronous motor at a speed above said constant speed, an output shaft connected to said load, first clutch means for controllably clutching said flexible shaft to said output shaft to accelerate said load while said flexible shaft absorbs the shock of said clutching and said acceleration, a synchronous motor running at said constant speed, and second clutch means for connecting said synchronous motor to said output shaft when the speed of said load equals the speed of said synchronous motor, whereby said synchronous motor and said flexible shaft jointly absorb any speed variations in said nonsynchronous motor to maintain said load speed at said constant value.

2. Apparatus for driving a load at a substantially constant speed comprising a nonsynchronous motor, a flexible shaft driven by said nonsynchronous motor at a speed above said constant speed, an output shaft connected to said load, first spring clutch means for controllably clutching said flexible shaft to said output shaft to accelerate said load while said flexible shaft absorbs the shock of said clutching and said acceleration, a synchronous motor running at said constant speed, and second spring clutch means for connecting said synchronous motor to said output shaft when the speed of said load equals the speed of said synchronous motor, whereby said synchronous motor and said flexible shaft jointly absorb any speed variations in said nonsynchronous motor to maintain said load speed at said constant value.

3. Apparatus for driving a load at a substantially constant speed comprising a nonsynchronous motor, a flexible shaft driven by said nonsynchronous motor at a speed above said constant speed, an output shaft connected to said load, first spring clutch means extending coaxially of said flexible shaft and said output shaft for controllably clutching said flexible shaft to said output shaft to accelerate said load while said flexible shaft absorbs the shock of said clutching and said acceleration, a synchronous motor having a drive shaft running at said constant speed, and second spring clutch means for connecting said synchronous motor drive shaft to said output shaft when the speed of said load equals the speed of said synchronous motor, whereby said synchronous motor and said flexible shaft jointly absorb any speed variations in said nonsynchronous motor to maintain said load speed at said constant value.

4. Apparatus for driving a load at a substantially constant speed comprising a nonsynchronous motor, a forward flexible shaft driven by said nonsynchronous motor at a speed above said constant speed, a reverse flexible shaft driven by said nonsynchronous motor, an output shaft connected to said load, forward clutch means for controllably clutching said forward flexible shaft to said output shaft to accelerate said load in a forward direction, reverse clutch means for controllably clutching said reverse flexible shaft to said output shaft to accelerate said load in a reverse direction, a synchronous motor running at said constant speed, and overriding clutch means for connecting said synchronous motor to said output shaft when the speed of said load in said forward direction equals the speed of said synchronous motor, whereby said synchronous motor and said flexible shaft jointly absorb any speed variations in said nonsynchronous motor to maintain said load speed at said constant value.

5. Apparatus for driving a load at a substantially constant speed comprising a nonsynchronous motor, a forward flexible shaft driven by said nonsynchronous motor at a speed above said constant speed, a reverse flexible shaft driven by said nonsynchronous motor, an output shaft connected to said load, forward clutch means for controllably clutching said forward flexible shaft to said output shaft to accelerate said load in a forward direction, reverse clutch means for controllably clutching said reverse flexible shaft to said output shaft to accelerate said load in a reverse direction, interlocking means for preventing simultaneous operation of said forward and said reverse clutch means, a synchronous motor running at said constant speed, and overriding clutch means for connecting said synchronous motor to said output shaft when the speed of said load in said forward direction equals the speed of said synchronous motor, whereby said synchronous motor and said flexible shaft jointly absorb any speed variations in said nonsynchronous motor to maintain said load speed at said constant value.

6. Apparatus for driving a load at a substantially constant speed comprising a nonsynchronous motor, a forward flexible shaft driven by said nonsynchronous motor at a speed above said constant speed, a reverse flexible shaft driven by said nonsynchronous motor, an output shaft connected to said load, forward clutch means for controllably clutching said forward flexible shaft to said output shaft to accelerate said load in a forward direction, reverse clutch means for controllably clutching said reverse flexible shaft to said output shaft to accelerate said load in a reverse direction, a synchronous motor running at said constant speed, first overriding clutch means for connecting said synchronous motor to said output shaft when the speed of said load in said forward direction equals the speed of said synchronous motor, and second overriding clutch means for connecting said synchronous motor to said output shaft when the speed of said load in said reverse direction equals the speed of said synchronous motor, whereby said synchronous motor and said flexible shaft jointly absorb any speed variations in said nonsynchronous motor to maintain said load speed at said constant value.

References Cited in the file of this patent
UNITED STATES PATENTS

| | | |
|---|---|---|
| 2,537,083 | Peoples | Jan. 9, 1951 |
| 2,679,167 | Michinson | May 25, 1954 |
| 2,763,161 | Bergson | Sept. 18, 1956 |